US010150063B2

(12) United States Patent
Garbon et al.

(10) Patent No.: US 10,150,063 B2
(45) Date of Patent: Dec. 11, 2018

(54) HYDRODYNAMIC SEPARATOR

(71) Applicant: CONTECH ENGINEERED SOLUTIONS LLC, West Chester, OH (US)

(72) Inventors: Joel A. Garbon, Portland, OR (US); Jordan S. Kahlenberg, Parkton, MD (US); Benjamin S. Farrell, Columbia, MD (US); Scott D. Perry, East Aurora, NY (US)

(73) Assignee: CONTECH ENGINEERED SOLUTIONS LLC, West Chester, OH (US)

( * ) Notice: Subject to any disclaimer, the term of this patent is extended or adjusted under 35 U.S.C. 154(b) by 0 days.

(21) Appl. No.: 15/393,786

(22) Filed: Dec. 29, 2016

(65) Prior Publication Data

US 2018/0185770 A1    Jul. 5, 2018

(51) Int. Cl.
*E03F 5/14* (2006.01)
*B01D 21/24* (2006.01)
*B01D 21/00* (2006.01)

(52) U.S. Cl.
CPC ..... *B01D 21/2405* (2013.01); *B01D 21/0036* (2013.01); *B01D 21/2416* (2013.01); *B01D 21/2433* (2013.01); *E03F 5/14* (2013.01); *B01D 21/2444* (2013.01)

(58) Field of Classification Search
CPC ...... E03F 5/0403; E03F 5/14; B01D 21/0036; B01D 21/2405; B01D 21/2416; B01D 21/2444
USPC ..... 210/170.03, 519, 521, 532.1, 747.2, 801
See application file for complete search history.

(56) References Cited

U.S. PATENT DOCUMENTS

| 3,957,656 A * | 5/1976 | Castelli ............. B01D 17/0208 |
| | | 210/521 |
| 4,985,148 A | 1/1991 | Monteith |
| 5,498,331 A | 3/1996 | Monteith |
| 5,725,760 A | 3/1998 | Monteith |

(Continued)

FOREIGN PATENT DOCUMENTS

| KR | 100896015 | 5/2009 |
| KR | 101036944 | 5/2011 |

OTHER PUBLICATIONS

PCT, International Search Report and Written Opinion, International Application No. PCT/US2017/63349, dated Mar. 28, 2018, 13 pages.

*Primary Examiner* — Christopher Upton
(74) *Attorney, Agent, or Firm* — Thompson Hine LLP

(57) ABSTRACT

A separator unit includes a tank defining an internal volume and having an inlet and an outlet. A deck within the tank separates the tank into an upper chamber and a lower chamber. A weir at an upper side of the deck defines an inlet side atop the deck for receiving an influent liquid and an outlet side atop the deck, with a first opening through the deck on the inlet side for delivering liquid down into the lower chamber, and a second opening through the deck on the outlet side for delivering liquid from the lower chamber back up into the upper chamber. The separator includes one or more of an integrated drop pipe assembly with a dispersal manifold, a riser pipe with a vortex disrupting vane and/or a weir configuration that in part follows a periphery of the second opening.

15 Claims, 12 Drawing Sheets

(56) References Cited

U.S. PATENT DOCUMENTS

| | | | |
|---|---|---|---|
| 5,746,911 A * | 5/1998 | Pank | E03F 5/16 |
| | | | 210/170.03 |
| 5,753,115 A | 5/1998 | Monteith | |
| 5,759,415 A | 6/1998 | Adams | |
| 5,849,181 A | 12/1998 | Monteith | |
| 6,062,767 A * | 5/2000 | Kizhnerman | E03F 5/16 |
| | | | 210/170.03 |
| 6,068,765 A | 5/2000 | Monteith | |
| 6,126,817 A | 10/2000 | Duran et al. | |
| 6,200,484 B1 * | 3/2001 | McInnis | E03F 5/0401 |
| | | | 210/170.03 |
| 6,276,537 B1 * | 8/2001 | Esler | B01D 21/2416 |
| | | | 210/519 |
| 6,371,690 B1 | 4/2002 | Monteith | |
| 6,419,843 B1 | 7/2002 | Natarius | |
| 6,475,381 B1 | 11/2002 | Gustafsson | |
| 6,547,962 B2 | 4/2003 | Kistner et al. | |
| 6,780,310 B1 | 8/2004 | Howe | |
| 6,797,161 B2 | 9/2004 | Use et al. | |
| 6,913,155 B2 | 7/2005 | Bryant | |
| 6,951,619 B2 | 10/2005 | Bryant | |
| 7,182,874 B2 | 2/2007 | Allard et al. | |
| 7,297,266 B2 | 11/2007 | Cobb et al. | |
| 7,314,549 B2 * | 1/2008 | Swift | E03F 5/16 |
| | | | 210/170.03 |
| 7,332,091 B2 | 2/2008 | Peters, Jr. et al. | |
| 7,344,636 B2 | 3/2008 | Faram et al. | |
| 7,378,027 B2 | 5/2008 | Zhou | |
| 7,470,361 B2 | 12/2008 | Eberly | |
| 7,507,333 B2 | 3/2009 | Meyermann | |
| 7,527,731 B2 | 5/2009 | Su et al. | |
| 7,582,216 B2 | 9/2009 | Arnott et al. | |
| 7,641,805 B2 | 1/2010 | Battan et al. | |
| 7,666,303 B2 | 2/2010 | Williams et al. | |
| 7,699,984 B2 | 4/2010 | Andoh et al. | |
| 7,722,763 B2 | 5/2010 | Benty et al. | |
| 7,951,294 B2 | 5/2011 | Duran et al. | |
| 8,142,666 B1 | 3/2012 | Happel | |
| 8,287,726 B2 | 10/2012 | Williams et al. | |
| 8,496,814 B2 | 7/2013 | Kent | |
| 8,663,466 B2 | 3/2014 | Braunwarth et al. | |
| 8,715,507 B2 | 5/2014 | Gulliver et al. | |
| 2005/0016905 A1 | 1/2005 | Lindow | |
| 2006/0283814 A1 | 12/2006 | Williamson et al. | |
| 2008/0185325 A1 | 8/2008 | Murray et al. | |
| 2009/0020466 A1 | 1/2009 | Williams | |
| 2011/0186492 A1 | 8/2011 | Holtz | |
| 2013/0306577 A1 | 11/2013 | Mayer et al. | |
| 2014/0110359 A1 | 4/2014 | Haywood et al. | |
| 2015/0048014 A1 | 2/2015 | Anastasio et al. | |
| 2016/0160489 A1 | 6/2016 | Garbon | |

* cited by examiner

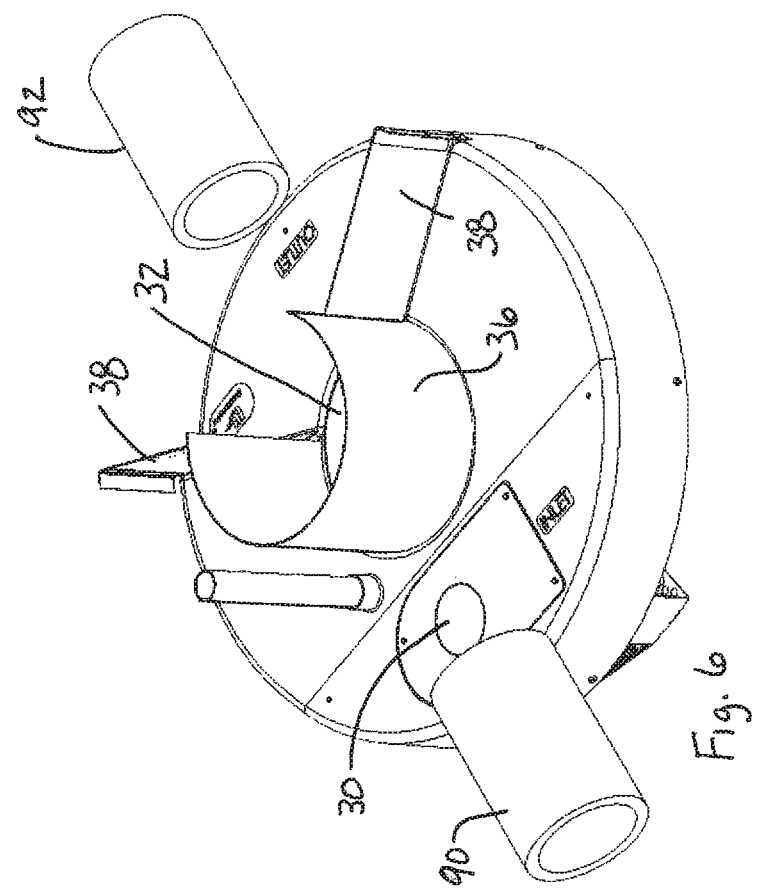

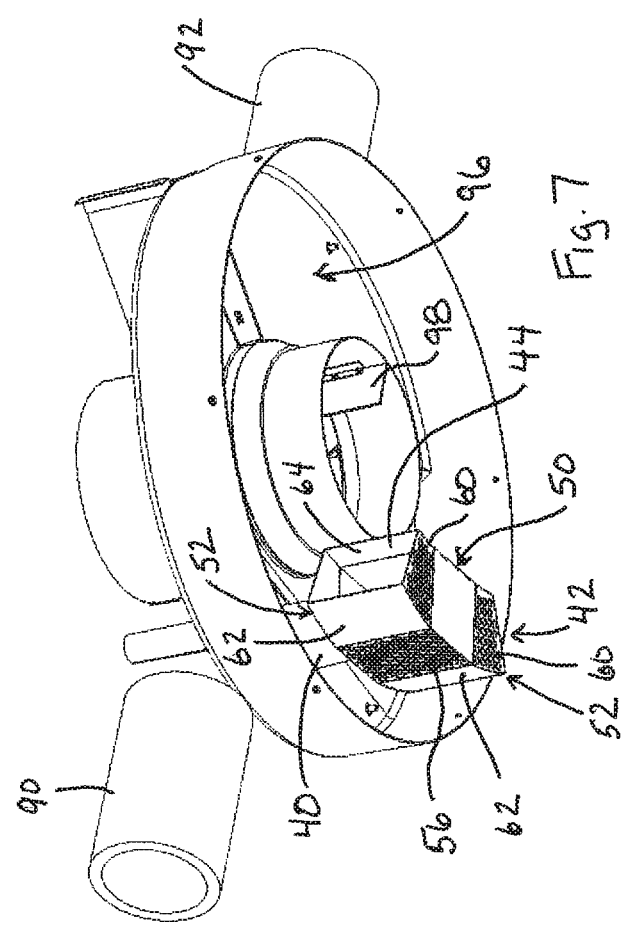

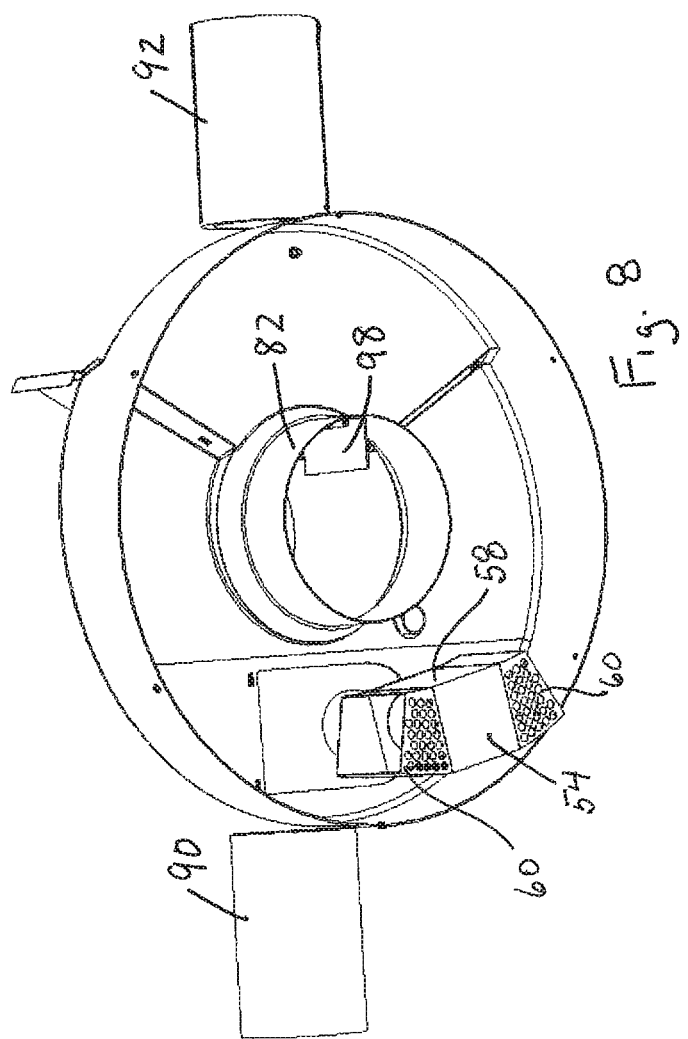

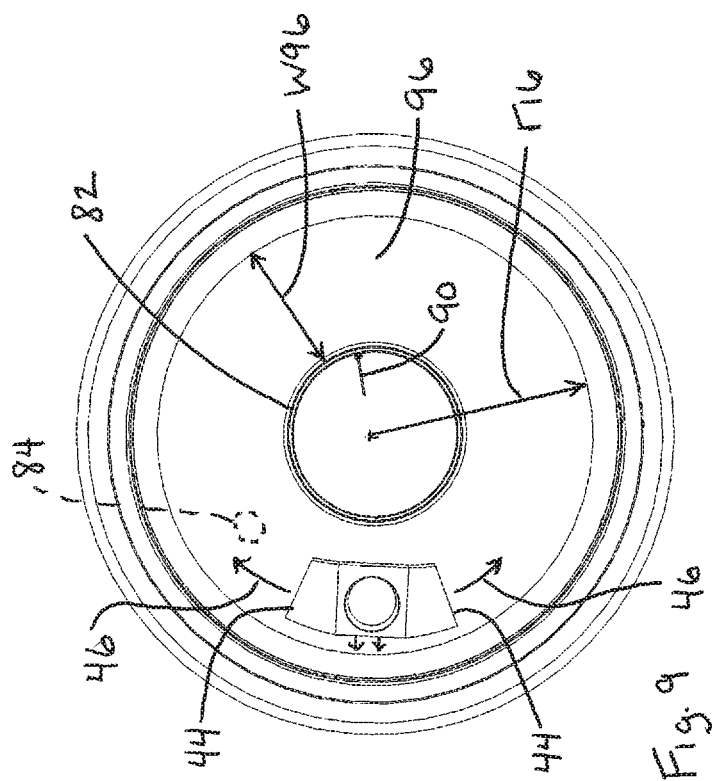

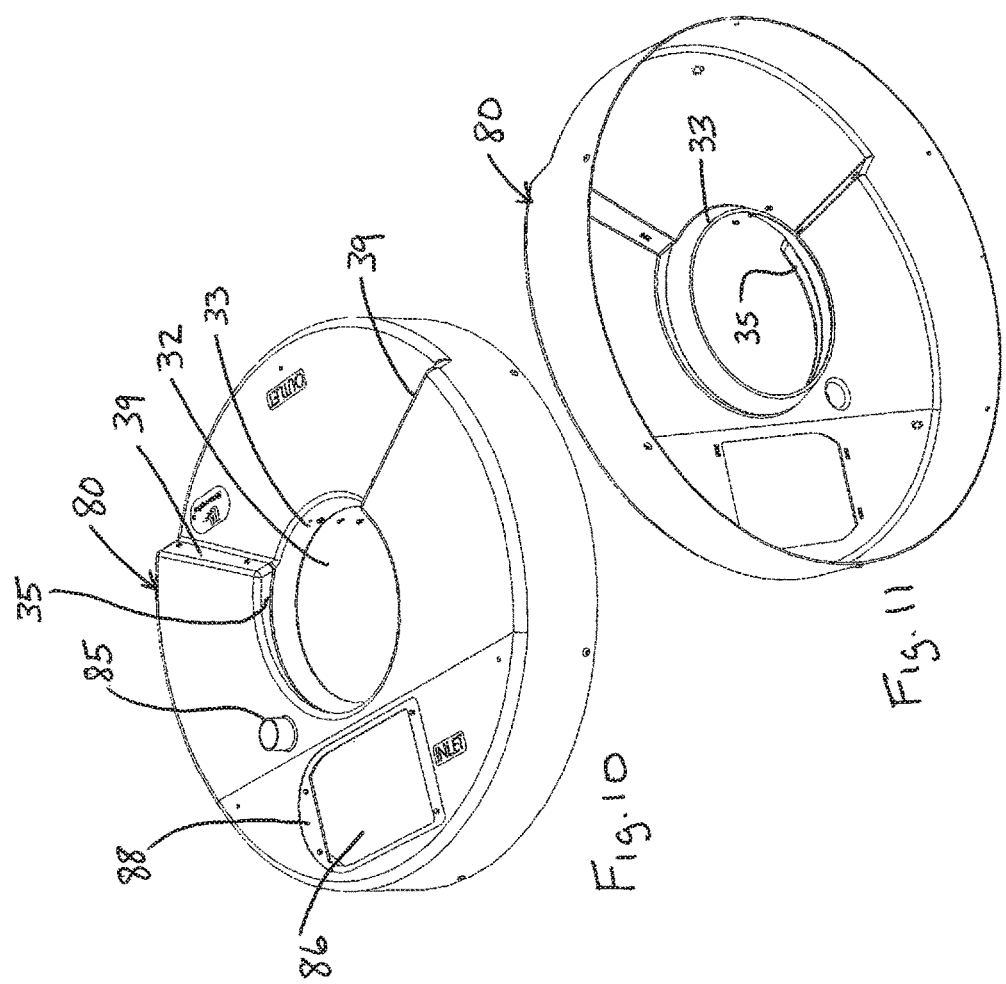

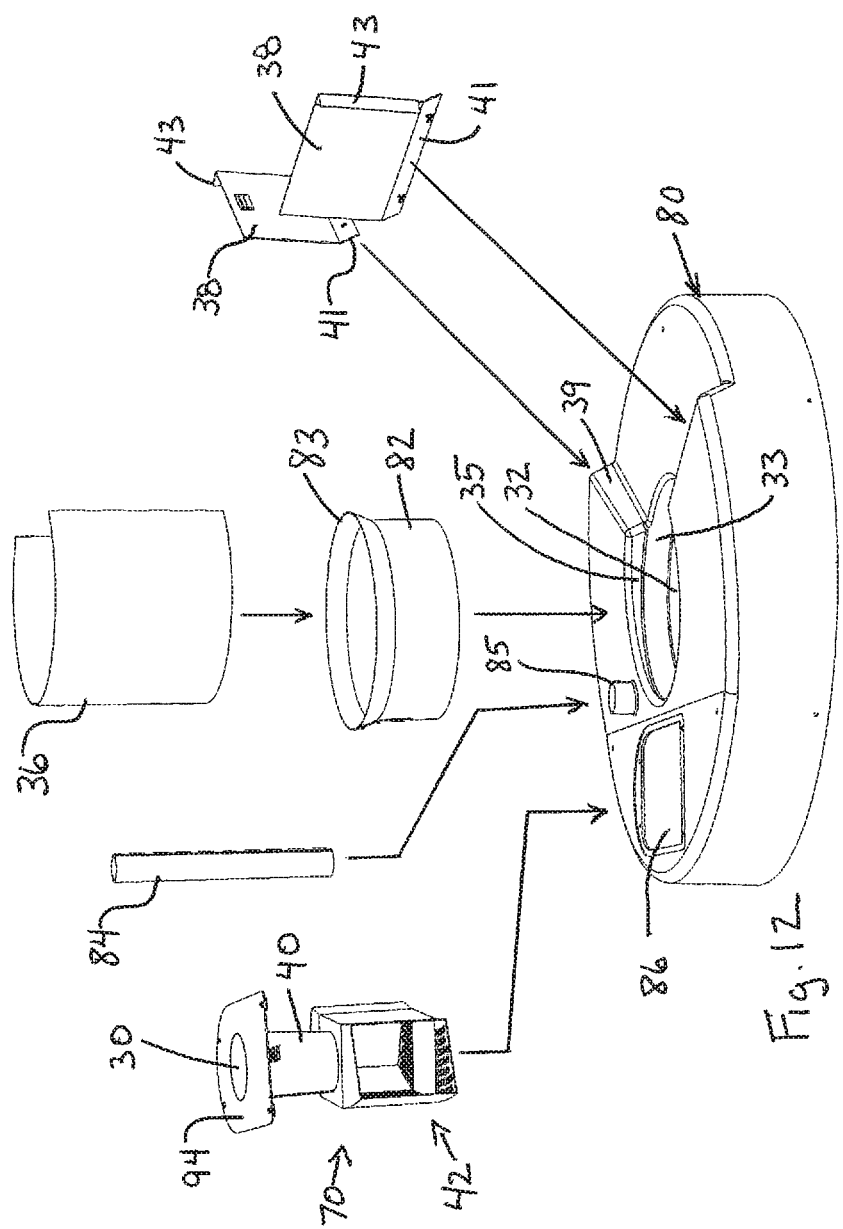

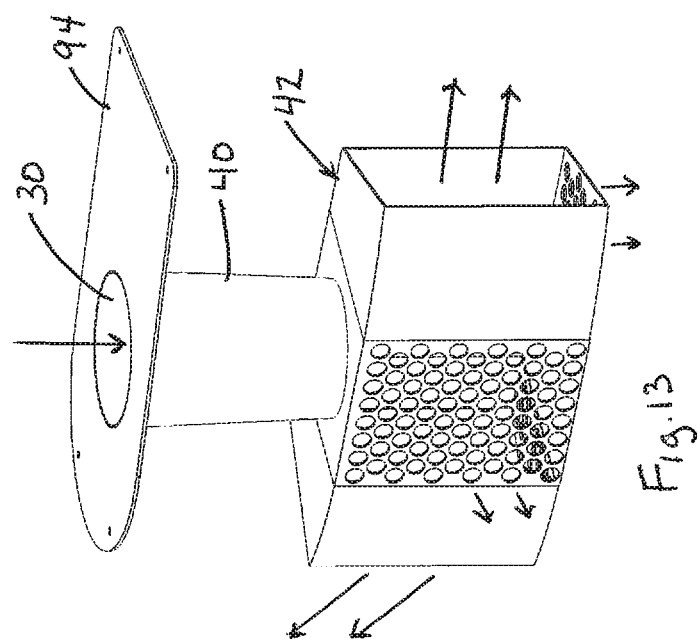

HYDRODYNAMIC SEPARATOR

TECHNICAL FIELD

This application relates generally to separator tanks that receive stormwater runoff, and, more particularly, to separator tanks having high sedimentation, floatables and/or debris removal and retention even in the case of high flow rates through their lower chambers.

BACKGROUND

The protection of ground water and natural bodies of water requires systems for diverting and/or treating water that contacts roadways, parking lots, and other man-made structures. If such diversion or treatment systems are not provided, particulates and other contaminants located on or forming part of such structures may be carried by drain water or stormwater to the natural water bodies and contaminate them. Local, state and federal laws and rules require municipalities, businesses and, in some instances, private entities, to establish means to reduce particulate and contaminant levels permissibly transferred to natural bodies of water from property under their control. Particular requirements may vary from jurisdiction to jurisdiction, but all are likely to become more, rather than less, stringent.

Most new land development plans and upgrades to existing paved surfaces involve the insertion of a preliminary separation system, generally for connection to the municipal water-handling infrastructure. Any preliminary separation system should be designed with the capability to receive fluid flowing in at a wide range of rates. It is desirable, then, to have a separation system capable of handling variable fluid flow rates with reduced likelihood of backup and flooding of the surface above. It is also desirable to control the flow through the system such that trapped particulates are not scoured or washed out of the device and re-entrained during high flows for passage downstream.

A variety of stormwater separation systems exist. These systems generally include a tank or container including a storage or treatment chamber within which, ideally, floating particulates are retained, and non-floating particulates are allowed to settle. The storage chamber includes an inlet for receiving untreated water, and an outlet for movement of treated water out of the chamber. The tank may also include a bypass arrangement to allow excess untreated water to exit the tank without passing through the storage chamber. In one implementation of such systems the storage chamber is located in a lower part of the tank and the bypass is located in an upper part of the tank, with an insert or deck located within the tank to separate the two chambers, the insert having one opening that defines the storage chamber inlet and another opening that defines the storage chamber outlet.

The device shown in U.S. Pat. No. 7,666,303 is exemplary of such a separator and utilizes a T-shaped drop tube at the storage chamber inlet to direct inflows into the storage chamber, a riser tube at the storage chamber outlet to define a floatables collection area in the upper part of the storage chamber and a weir atop the insert to direct incoming stormwater to the storage chamber. As flows through the storage chamber of such a separator system are increased (e.g., by raising the height of the weir), less stormwater flow bypasses, but potential for scouring and washout within the storage chamber increases.

Accordingly, it would be desirable to provide a separator with increased treatment flow capacity while at the same time incorporating one or more cost-effective features to limit scouring and washout.

SUMMARY

In one aspect, a separator unit includes a tank defining an internal volume and having an inlet and an outlet. An insert within the tank separates the tank into an upper chamber and a lower chamber. The insert includes a weir at an upper side of the insert to define an inlet side atop the insert for receiving an influent liquid and an outlet side atop the insert, a first opening through the insert on the inlet side for delivering liquid down into the lower chamber, and a second opening through the insert on the outlet side for delivering liquid from the lower chamber back up into the upper chamber. The second opening is located substantially centrally on the insert, the weir is formed by a central curved wall segment and a pair of lateral wall segments, and the central curved wall segment extending along a portion of a peripheral boundary of the second opening.

In another aspect, a separator unit includes a tank defining an internal volume and having an inlet and an outlet. A deck within the tank separates the tank into an upper chamber and a lower chamber, with a weir at an upper side of the deck to define an inlet side atop the deck for receiving an influent liquid and an outlet side atop the deck, a first opening through the deck on the inlet side for delivering liquid down into the lower chamber, and a second opening through the deck on the outlet side for delivering liquid from the lower chamber back up into the upper chamber. A drop pipe extends downward from the first opening to a dispersal manifold having a first primary lateral opening to direct water laterally into the lower chamber in one direction and a second primary lateral opening to direct water laterally into the lower chamber in another direction. The dispersal manifold includes a central segment, a first side segment and a second side segment, wherein the central segment has a lower wall that is non-perforated and a first sidewall facing a near wall of the tank and extending upward from the bottom wall and that is perforated.

In yet another aspect, a separator unit includes a tank defining an internal volume and having an inlet and an outlet. A deck within the tank separates the tank into an upper chamber and a lower chamber, with a weir at an upper side of the deck to define an inlet side atop the deck for receiving an influent liquid and an outlet side atop the deck, a mount opening through the deck on the inlet side, and another opening through the deck on the outlet side. A drop pipe assembly is connected to the mount opening, and the drop pipe assembly includes an upper support plate, a drop pipe and a dispersal manifold integrated as a unit. The upper support plate has a periphery that sits atop the mount opening, and an opening is formed in the upper support plate to deliver liquid into the drop pipe.

In a further aspect, a separator unit includes a tank defining an internal volume and having an inlet and an outlet. A deck within the tank separates the tank into an upper chamber and a lower chamber, with a weir at an upper side of the deck to define an inlet side atop the deck for receiving an influent liquid and an outlet side atop the deck, a first opening through the deck on the inlet side for delivering liquid down into the lower chamber, and a second opening through the deck on the outlet side for delivering liquid from the lower chamber back up into the upper chamber. A riser pipe extends downwardly into the lower chamber from the second opening, wherein the riser pipe includes at least one vortex disrupting vane extending inwardly from an inner surface of the riser ripe.

In another aspect, a hydrodynamic separator unit for treating stormwater flows includes a tank defining an internal volume and having an inlet and an outlet, the tank being of right circular cylinder shape to define a tank diameter. A deck within the tank separates the tank into an upper chamber and a lower chamber, with a weir at an upper side of the deck to define an inlet side atop the deck for receiving an influent liquid and an outlet side atop the deck, a first opening through the deck on the inlet side for delivering liquid down into the lower chamber, and a second opening through the deck on the outlet side for delivering liquid from the lower chamber back up into the upper chamber. A drop pipe extends downward from the first opening and is of a conical shape such that a bottom opening of the drop pipe is smaller than the first opening, wherein a diameter of the first opening is between about 10% and 12% of the tank diameter, and a diameter of the bottom opening is between about 8% and 10% of the tank diameter. The second opening is located substantially centrally within the tank, the weir is formed by a central curved wall segment and a pair of lateral wall segments, the central curved wall segment extending along a portion of a peripheral boundary of the second opening, wherein each lateral wall segment is substantially planar in shape and extends from the central curved wall segment to an inside surface of the tank, wherein the lateral wall segments are positioned such that an arcuate extent of the inlet side of the deck is about two-hundred forty degrees. A riser pipe extends downward from the second opening, wherein a diameter of the second opening and the riser pipe is between about 30% and 35% of the tank diameter.

In yet another aspect, a method of providing multiple sizes of separator units, comprises: utilizing a consistent separator unit configuration among multiple sizes, wherein the separator unit configuration comprises a tank defining an internal volume and having an inlet and an outlet, the tank being of right circular cylinder shape to define a tank diameter that specifies the size of the separator unit, a deck within the tank and separating the tank into an upper chamber and a lower chamber, a weir at an upper side of the deck to define an inlet side atop the deck for receiving an influent liquid and an outlet side atop the deck, a first opening through the deck on the inlet side for delivering liquid down into the lower chamber, and a second opening through the deck on the outlet side for delivering liquid from the lower chamber back up into the upper chamber, a drop pipe extending downward from the first opening and having a conical shape such that a bottom opening of the drop pipe is smaller than the first opening, and a riser pipe extending downward from the second opening; and for each of the multiples sizes, setting each of (i) a diameter of the first opening as a first consistent function of the tank diameter, a diameter of the bottom opening as a second consistent function of the tank diameter, and (iii) a diameter of the second opening as a third consistent function of the tank diameter.

The details of one or more embodiments are set forth in the accompanying drawings and the description below. Other features, objects, and advantages will be apparent from the description and drawings, and from the claims.

BRIEF DESCRIPTION OF THE DRAWINGS

FIGS. 6, 7 and 8 are perspective views of the deck insert of the separator, with inlet and outlet pipes also shown;

FIG. 9 is a top down cross-section view of the separator taken along a horizontal plane below the deck;

FIGS. 10 and 11 are perspective views of a deck of the separator;

FIG. 12 is an exploded perspective view of the deck insert including the deck and primary deck insert components; and FIG. 13 is a perspective view of a drop pipe assembly of the deck insert.

DETAILED DESCRIPTION

Figure 1:
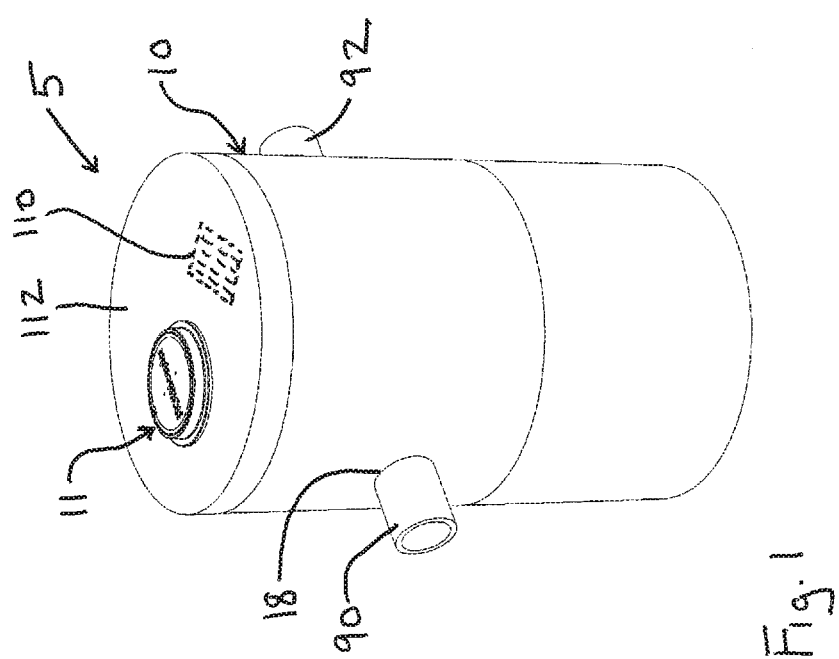
FIG. 1 is a perspective view of one embodiment of a separator unit.
Figure 2:
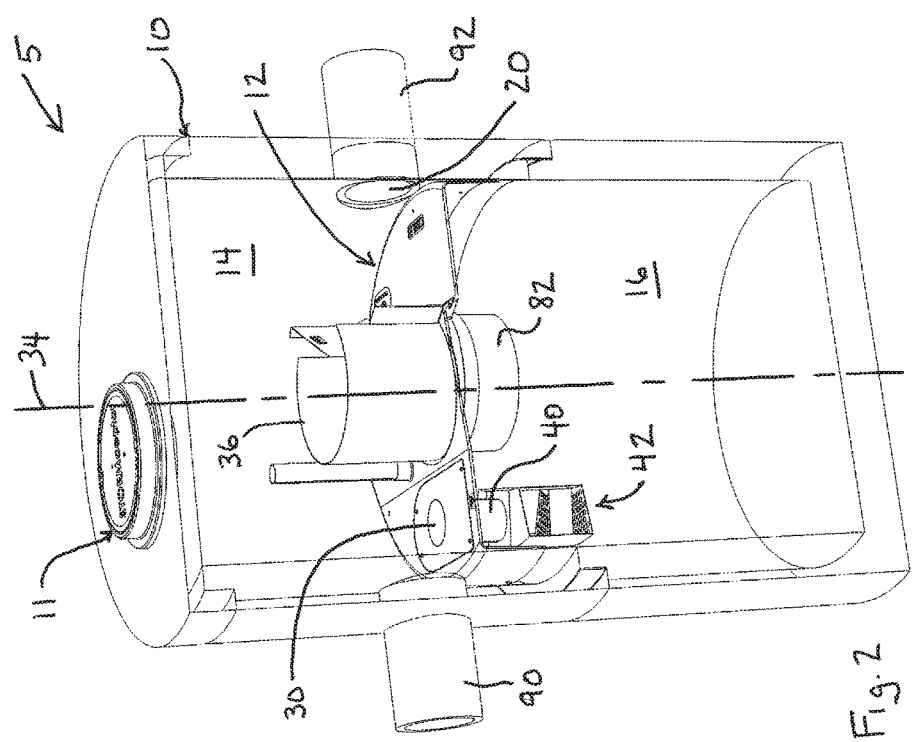
FIG. 2 is a cross-section view of the separator unit of FIG. 1 along a vertical plane to one side of the center of the separator.
Figure 3:
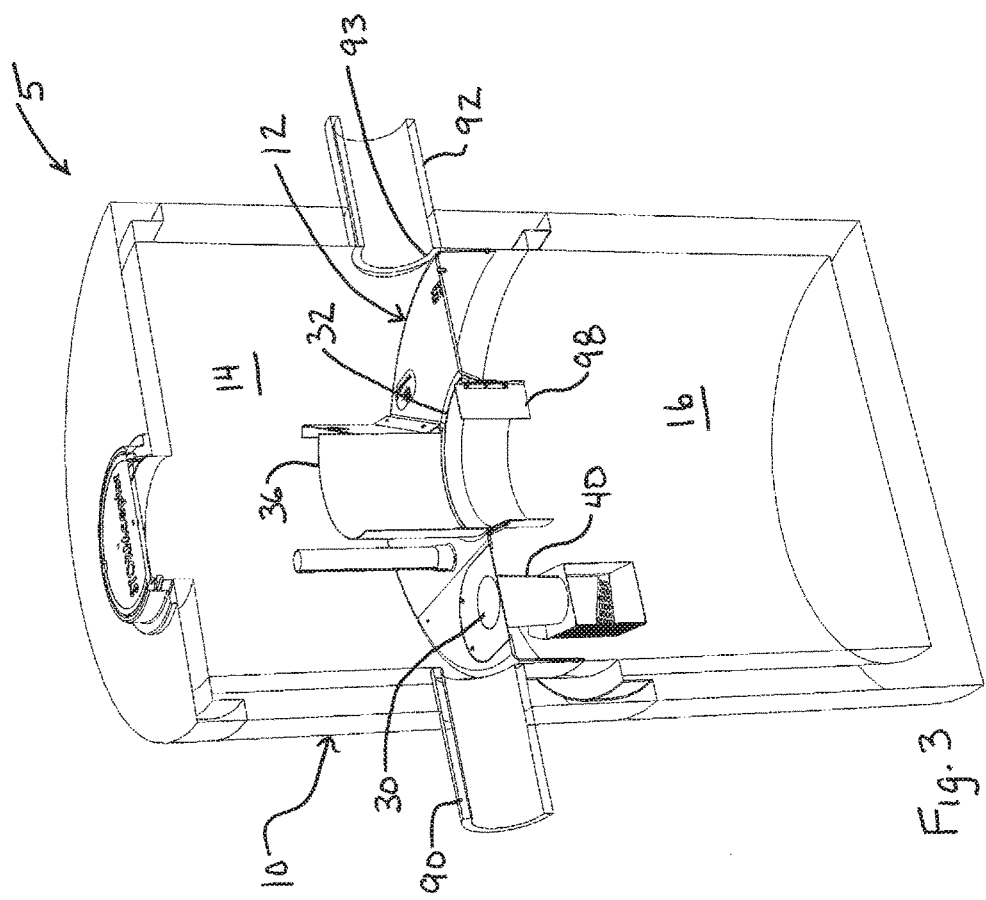
FIG. 3 is a cross-section view of the separator unit of FIG. 1 along a vertical plane passing through the center of the separator.
Figure 4:
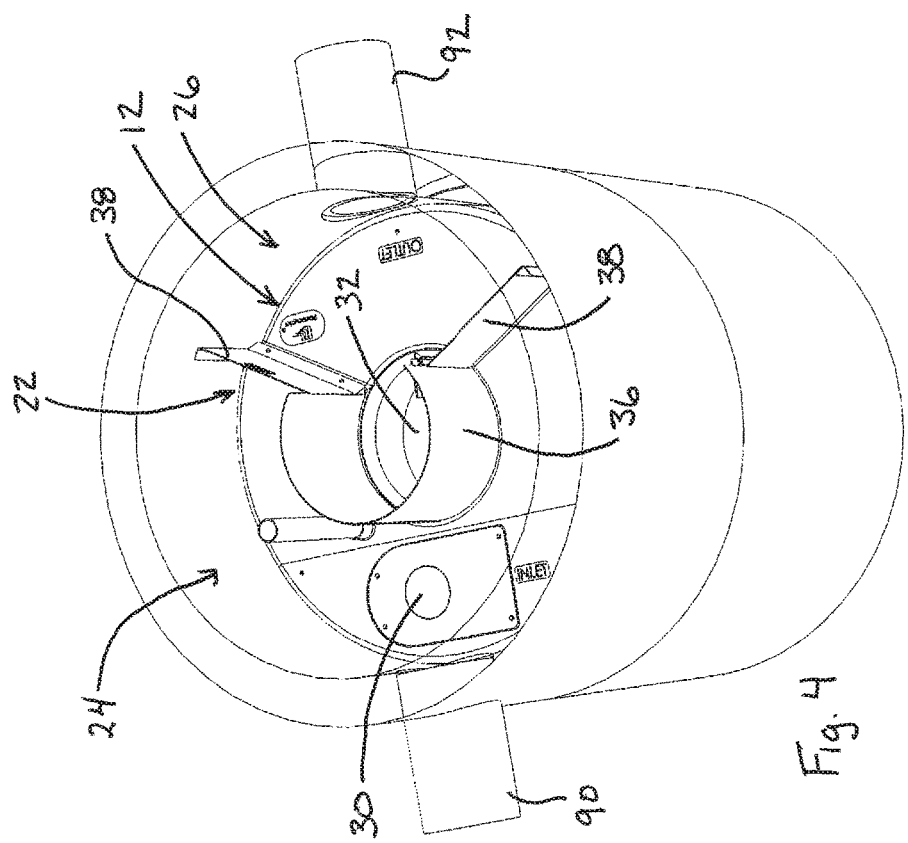
FIG. 4 is a perspective internal view of the separator with a top portion of the tank removed.

Referring to FIGS. 1-13, a separator 5 includes a tank 10 with an upper manhole access port 11, and in internal deck insert 12 that divides the tank into an upper chamber 14 and a lower chamber 16. The deck insert 302 may, by way of example, be of fiberglass construction and be attached to the tank sidewalls by brackets, fasteners or other suitable structure, but other variations are possible. The tank 10 includes one or more sidewall inlets 18 and a sidewall outlet 20. Exemplary inlet pipe 90 and outlet pipe 92 are shown connected to the inlet and outlet respectively. In one example the tank may be of cylindrical (e.g., a right circular cylinder) concrete manhole type configuration, but other tank structures are possible. The insert 12 includes a weir 22 that extends upward from the upper surface of the deck and across the deck from one location on the tank sidewall to another so as to divide the top of the insert into an upstream (inlet) side 24 and a downstream (outlet side) 26. In the illustrated embodiment, the weir divides the top of the insert into an upstream side 24 of approximate arc of 240° and a downstream side 26 of approximate arc of 120° and thereby accommodates multiple inlet pipes and a wide range of inlet and outlet angles, largely dependent on unit diameter, pipe diameter and pipe material of construction.

The inlet side 24 of the insert may be sloped toward an opening 30 of the insert that leads down to the lower chamber 16 to deliver incoming water to be treated into the lower chamber 16. Such sloping reduces the potential for sediment accumulation on the top side of the deck, and increases capture of both sediment and gross pollutants that may settle on the deck's surface during an event by directing these pollutants into the drop pipe inlet opening 30 as flows subside. Water passing through the lower chamber exits the lower chamber through an opening 32 (with associate riser pipe 82) on the opposite side of the weir 22. Notably, the flow outlet opening 32 from the lower chamber 16 is substantially centered on a central axis 34 of the cylindrical tank 10. The weir 22 is formed by a central arcuate wall segment 36 and a pair of lateral wall segments 38 extending outward from the central segment 36. The central arcuate wall segment 36 extends along a portion of a peripheral boundary of the opening 32 and has a convex surface side 51 facing toward the inlet 18 of the tank and a concave surface side 53 facing toward the upright axis 34 of the tank and opening 32. Here, the central arcuate wall segment 36 extends through at least two-hundred circumferential degrees (e.g., at least two-hundred twenty circumferential degrees, such as two-hundred forty circumferential degrees), and each lateral wall segment 38 extends generally linearly and is planar in configuration. Here, the central wall segment 36 also has a top edge that is higher than the top edge of either of the lateral wall segments 38. The height of the straight wall segments 38 of the weir above the outlet pipe 92 invert 93 may vary depending on the design surface loading rate of the device or any tailwater conditions within the stormwater network, and may typically be about 15 inches, but can vary as desired. The height of the curved arcuate central segment of the weir may be about 6 inches above the elevation of the straight wall portions of the weir.

Notably, the diameter of the opening 32, and similarly the effective diameter of the arcuate wall segment 36, may be suitably sized for access to the lower chamber 16 for cleanout using a suction pipe or hose, but may also be sized to enable a person to access the lower chamber if needed (e.g., a diameter of 20 inches or more, such as 24 inches). Thus, the opening 32 serves the dual purpose of both functioning as the outlet flow opening from the lower chamber and functioning as the primary cleanout and/or maintenance access opening to the lower chamber.

A drop pipe 40 extends downward from the opening 30 to a dispersal manifold 42 for delivering water into the lower chamber 16. The dispersal manifold 42 has a unique and advantageous configuration for separator performance. In particular, the dispersal manifold has opposite primary lateral openings 44 to direct water laterally into the lower chamber 16 in respective opposite lateral directions (represented by arrows 46 in FIG. 9). The dispersal manifold 42 is made up of a central segment 50 and two side segments or wings 52, where the side segments are substantially arcuate, and each have a convex surface side facing toward the inlet side of the tank wall or near location of the tank wall and a concave surface side facing toward the riser pipe 82. As best seen in FIGS. 7-9, here, the central segment has a bottom floor or wall 54, an outwardly facing sidewall 56 and an inwardly facing sidewall 58 extending upward from the bottom wall, where the bottom floor or wall 54 is non-perforated, the outwardly facing sidewall 56 is perforated and the inwardly facing sidewall 58 is non-perforated. Each side segment 52 of the dispersal manifold includes a respective bottom floor or wall 60 and outwardly and inwardly facing sidewalls 62 and 64, where the bottom wall 60 is perforated and the sidewalls 62 and 64 are not perforated, with sidewall 62 forming the convex surface side of the side segment that faces the inlet side of the tank wall and with sidewall 64 forming the concave surface side of the side segment that faces the riser pipe. The top wall 66 of the central segment is non-perforated (but includes an opening with which the drop pipe 40 connects), and the top walls 68 of the respective side segments are also non-perforated.

Notably, the upper inlet section of the drop pipe 40 has a circular opening and a the drop pipe 40 is of conical shape (reducing in diameter when moving downward) favorable for creating a vortex to enhance pollutant capture by pulling pollutants into the lower treatment chamber 16. The bottom of the cone-shaped drop pipe 40 is connected to the top wall of central segment 50 of the dispersal manifold or duct 42. The central segment and side or wing segments of the dispersal manifold have perforated and non-perforated walls as described above. The two rectangular primary outlet openings 44 of the side segments or wings, combined with the secondary perforations in the outwardly facing wall of the central segment and the secondary perforations in the floor of each side segment, allow the dispersal manifold to diffuse the influent flow in multiple directions and at lower average discharge velocity into the lower treatment chamber 16, as compared to a similar drop pipe and dispersal manifold arrangement without any perforations. The diffusion of influent flow in multiple directions and at lower average discharge velocity is favorable for removal of sediment and floatable pollutants such as oil, and is favorable for reducing scour and washout of previously captured sediment. Additionally, the perforations in the bottom wall or floor 60 of each side segment or wing of the dispersal manifold prevent sediment from accumulating on the floor of each side segment which might otherwise cause eventual clogging and flow restriction in a similar arrangement without perforations.

Referring to FIGS. 10-13, the deck insert is made up of a number of primary components, including a molded deck 80 (e.g., of fiberglass as described above), the weir wall segments 36 and 38, a riser pipe 82, an oil port pipe 84, and a drop pipe assembly 70 formed by integration of the drop pipe 40 and dispersal manifold 42. The oil port pipe 84 connects to an oil port stub 85 of the deck, and the height of the oil port pipe is set to prevent water atop the deck from entering the oil port pipe during even bypass conditions within the separator. The riser pipe 82 fits down into the deck opening 32 and can be connected by suitable fasteners. For this purpose, the deck 80 includes a part conical rim 33 defining the opening 32, and the riser pipe 82 includes a part conical top flange 83 that is sized to sit within and against the rim 33, and two conical portions can be bolted together. The arcuate wall segment 36 of the weir fits within a similarly shaped arcuate boundary 35 of the opening 32 above the rim 33 and can be bolted thereto and/or connected to the lateral wall segments 38 for support. The deck includes an upper surface drop from the inlet side to the outlet side of the weir, forming a pair of angled steps 39, and the lower portion 41 of each lateral wall segment 38 of the weir is angled slightly to match the angle of the step 39 so that the angled portions sit adjacent each other. Bolts can be passed between the two angled portions 41 and 39 to connect the lateral wall segments 38 to the deck 80. Brackets 43 at the outer edges of the segments 38 connect to the tank walls.

The molded deck 80 includes a drop inlet opening 86 that is suitably sized to enable the lower portion of the drop pipe assembly 70 to be passed through the opening 86, and the opening 86 is bounded by a slight recess 88 in the upper surface of the deck that is configured to match a configuration of an upper support plate 94 of the drop pipe assembly 70. Notably, the peripheral shape of the recess 88 and the peripheral shape of the support plate 94 are non-symmetrical to assure desired orientation of the drop pipe assembly unit 70 when assembled to the deck 80 (e.g., using bolts or other suitable fasteners). The attachment bolts are removable and thereby allow for removal of the drop unit 70 for inspection and maintenance. Of course, alternative methods of mechanical attachment of the drop pipe other than bolting to the deck may be used to secure the drop pipe assembly in position. Here, the support plate 94 defines the opening 30 to the lower chamber.

Figure 5:
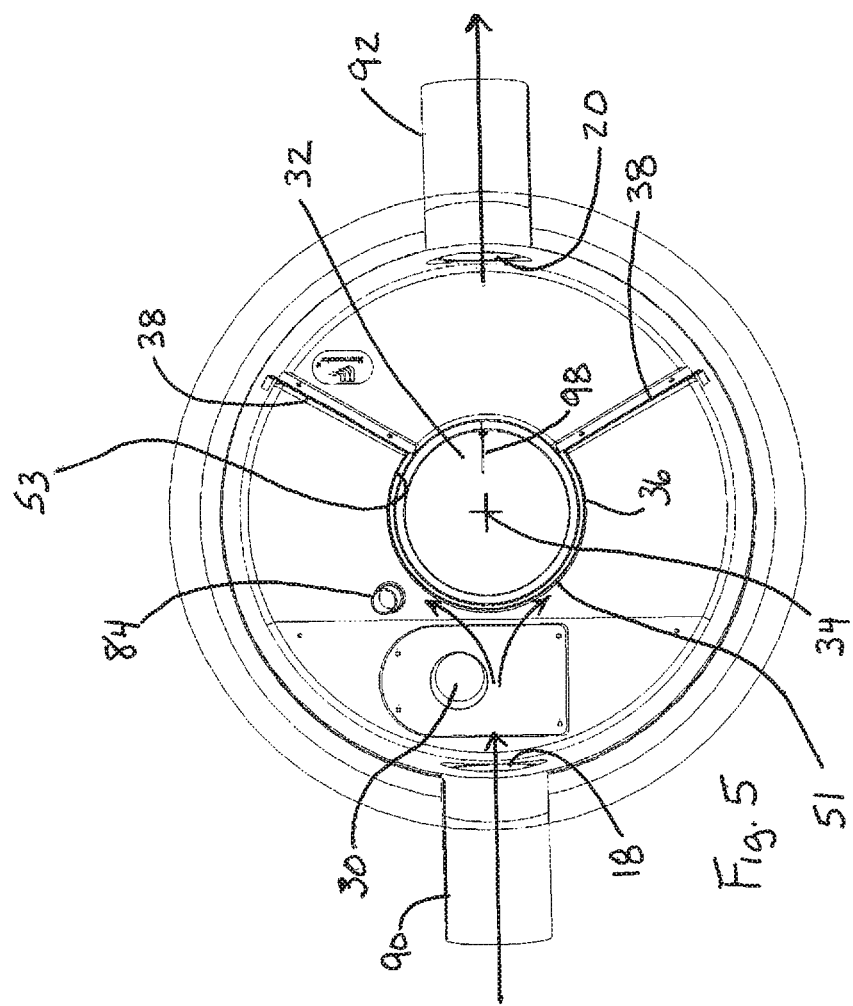
FIG. 5 is a top plan view of FIG. 4.

The circular opening 30 and conical shape of the inlet section of the drop pipe 40 is favorable for formation and sustenance of a vortex above the inlet opening 30 that enhances pollutant capture by pulling the pollutants into the treatment chamber. The drop pipe 40 is positioned such that the circular inlet opening 30 is not in the direct path of influent flow from the inlet pipe (as best seen in FIG. 5), thereby enhancing the formation and sustenance of a strong vortex above the inlet opening 30 of the drop pipe that might otherwise be disrupted if the circular inlet opening was directly in the influent flow path. The entrance edge of the circular inlet opening 30 of the drop pipe may be of variable rounding to reduce the pressure drop across the inlet opening and increase flow rate entering the drop pipe 40.

The cone-shape of the drop pipe 40 assures that the circular top opening 30 of the cone shaped drop pipe is of larger diameter than the circular bottom opening of the drop pipe. Thus, the bottom opening of the drop pipe 40 serves as the treatment flow control orifice for the separator unit, and the diameter of the top and bottom openings of the cone-shaped drop pipe may be set as desired to achieve the target design flow rate into the treatment chamber 16 and to modify the vortex strength within the cone-shaped drop pipe 40. The vertical length of the drop pipe 40 may be set as desired to discharge the influent at the desired elevation within the treatment chamber 16. The dimensions of the rectangular primary outlet openings 44 and the perforations of the dispersal manifold 42 may be set as desired to modify the average discharge velocity of influent flow into the treatment chamber 16.

The cylindrical riser pipe 82 extends downward from opening 32 into the lower treatment chamber 16, and is centrally located in the treatment chamber based upon the central position of the opening 32. Effluent from the lower treatment chamber 16 enters the lower opening of the riser pipe 82 and discharges from the upper opening of the riser pipe onto the top surface the deck downstream of the weir 22. The diameter of the riser pipe is at least ½ the radius r16 of the lower treatment chamber 16, such as about ⅔ the radius of the lower treatment chamber. The length of the riser pipe 82 may be set in conjunction with the depth of the treatment chamber 16 to increase or decrease pollutant storage volumes, and is typically a minimum 12 inches in length. An annular channel 96 of substantially uniform annular width W96 is thus formed in the treatment chamber surrounding the riser pipe 82, and the annular channel width W96 may be about ⅔ the radius of the lower treatment chamber (in cases where the diameter of the riser pipe 82 is ⅔ as suggested above).

In one implementation, where the tank is in the form of a right circular cylinder that defines a tank diameter, desirable scalability of the separator configuration is achieved by maintaining an arcuate inlet side 24 above the deck at between about 235 and 245 degrees and setting each of a diameter of the opening 30 (the top opening of the conical drop pipe) as a first consistent function of the tank diameter, a diameter of the bottom opening of the conical drop pipe as a second consistent function of the tank diameter, and a diameter of the opening 32 as a third consistent function of the tank diameter. Preferably, the first consistent function sets the diameter of the opening 30 to between about 10% and 12% of the tank diameter, the second consistent function sets the diameter of the bottom opening to between about 8% and 10% of the tank diameter, and the third consistent function sets the diameter of the opening 32 to between about 30% and 35% of the tank diameter. These functions/design parameters allow for consistency across a broad range of tank diameters, such 3, 4, 5, 6, 7, 8, 10 and 12 foot standard manhole diameters, as well as other diameters.

Incoming water to the treatment chamber 16 flows down the drop pipe 40 into the dispersal manifold 42 and flows out from the rectangular outlet openings 44 of dispersal manifold and discharges in an approximately tangential direction relative to the near portion of treatment chamber wall. Flow through the perforations in the outwardly facing side wall 56 of the central segment 50 of the dispersal manifold is discharged outwardly away from the center of the treatment chamber toward the near wall of the treatment chamber. Flow through the perforations in the bottom wall or floor 60 of each wing or side segment 52 of the dispersal manifold is discharged toward the bottom of the treatment chamber. Floatables, such as oil and gross pollutants, rise up within the channel 96 surrounding the riser pipe 82 and are trapped beneath the deck. Sediment settles to the floor of the treatment chamber 16. Effluent from the treatment chamber enters the lower end of the riser pipe 82. Due to the relatively large diameter of the riser pipe opening, the velocity of the stream entering the lower opening of the riser pipe 82 is relatively low, and thereby enhances sediment removal and reduces the probability of increased velocities within the water column and resuspension of previous captured sediment from the sump. As mentioned above, the central riser pipe 82 also serves as the primary inspection access and maintenance access port, and provides adequate access for insertion of both a vacuum hose and spray wand to remove accumulated sediment and floatable pollutants.

A vertically oriented vortex-disrupting vane 98 is installed within the riser pipe 82, and prevents the formation of a vortex within the riser pipe 82 that might otherwise occur at high flow rates in a riser pipe without the vortex-disrupting vane, and thereby prevents the potential scour and washout of previously captured sediment that such a vortex might induce. The vortex-disrupting vane may be comprised of a flexible material, such as a single row or multiple rows of polymeric filaments, or a polymeric blade. The vertical length of the vane 98 may typically be at least one-half the length of the riser pipe, but may be lesser or greater as needed to effect vortex disruption. The distance the vane extends inwardly from the inside wall of the riser pipe 82 may typically be at least about one-half the radius of the riser pipe, but may be lesser or greater as needed to effect vortex disruption. A single vane 98 or multiple vanes may be installed to effect vortex disruption. The attachment of the vane to the riser pipe may be by bolting or gluing or other suitable means of mechanical attachment. The flexible nature of the vane allows maintenance activities, such as vacuuming and rinsing of the treatment chamber, to occur with minimal interference and with minimal damage to the vane 98.

Some embodiments may utilize an inlet grate and frame (e.g. represented by dashed line form 110 in FIG. 1) embedded in the precast concrete top slab 112 of the tank in order to direct runoff into the treatment unit from above. In such cases, an optional removable flow deflector may be attached to the precast concrete top slab and beneath the inlet grate and frame, where the removable flow deflector channels inlet grate runoff onto the surface of the deck upstream of the weir (i.e., on the inlet side 24), and allows favorable positioning of the inlet frame and grate, and easy removal of the flow deflector, to facilitate inspection and maintenance. The flow deflector functions as a chute to convey and direct the runoff, and may be of varying width, length, and angle as needed to accommodate specific inlet frame dimensions and frame elevation above the insert weir.

In operation, the inlet pipe 90 (or in some case multiple inlet pipes or top grate inlet, or a combination of these) delivers stormwater influent to the top of the deck insert 12 on the upstream side 24 of the weir 22. A pond of variable depth depending on influent flow rate is formed on the upstream topside 24. Influent exiting the inlet pipe(s) 90 immediately contacts the pond, which serves to attenuate the water velocity for a wide range of inlet pipe entrance slopes (e.g., 8 degrees downward angle from horizontal) and inlet pipe angles as flow moves toward the upstream side of the weir 22, and thereby reduces the potential for "hydraulic jump" over the weir 22. Additionally, the curved and elevated partially-cylindrical central segment 36 of the weir serves to split the flow exiting the primary inlet pipe 90, thereby preventing hydraulic jump over the central portion of the weir.

Influent is conveyed into the inlet opening 30 of the drop pipe 40. The circular opening 30 and conical shape of the drop pipe 40, and offset location of the drop pipe inlet opening 30, are favorable for formation and sustenance of a vortex above the inlet opening 30 that enhances pollutant capture by pulling the pollutants into the treatment chamber 16. Influent is conveyed down through the drop pipe 40 into the dispersal manifold 42. Flow from the primary rectangular outlet openings 44 of each lateral or wing segment 52 of the dispersal manifold discharges in an approximately tangential direction relative to the near wall of the treatment chamber 16. Flow through the perforations in the outwardly facing sidewall 56 of the central segment 50 of the manifold 42 is discharged toward the near wall of the treatment chamber. Flow through the perforations in the bottom wall or floor of each side or wing segment 52 of the manifold is discharged toward the bottom of the treatment chamber 16. Floatables, such as oil and gross pollutants, rise up within the annular channel 96 surrounding the riser pipe 82 and are trapped beneath the deck 80. Sediment settles to the floor of the treatment chamber. Effluent from the treatment chamber enters the lower end of the riser pipe 82. The vortex-disrupting vane 98 within the riser pipe 82 prevents formation of a vortex within the riser pipe during high flow rates, thereby preventing scour and washout of previously captured sediment. Effluent from the lower treatment chamber 16 flow up through the riser pipe onto the top side of the deck at the downstream side 26 of the weir, and is delivered out the outlet pipe 92.

The flow rate into the lower treatment chamber 16 is a function of the water elevation on the upstream side 24 of the weir 22 and the area of the bottom opening of the cone-shaped drop pipe 40. During storm events with very high influent flow rates, the water elevation on the upstream side 24 of the weir 22 may exceed the height of the weir, and the excess flow passes over the top of the weir (e.g., over the top of the two lateral weir wall segments 38) to the downstream side 26 of the deck, and exits through the outlet pipe. This is an "internal bypass" feature.

When inspection or maintenance cleaning is performed, a measuring stick or vacuum hose is inserted through the centrally located riser pipe 82 to measure or remove sediment from the lower treatment chamber 16. For hydrocarbon presence, measurement and removal, inspection and maintenance can be performed through the oil inspection port 84. As a supplemental inspection and maintenance procedure, the drop pipe unit 70 may be removed and a vacuum hose or rinsing wand inserted through the deck opening 86 to access accumulated sediment in the sump. Having multiple openings for maintenance access provides capability for more thorough cleaning of the device.

It is to be clearly understood that the above description is intended by way of illustration and example only, is not intended to be taken by way of limitation, and that other changes and modifications are possible. For example, in some implementations the deck portion of the insert, as well as other portions, may be formed as an integral or unitary part of a separator tank (e.g., where a tank is of molded plastic configuration, or where the deck is formed of concrete cast with a concrete manhole structure). Regardless, the overall configuration of the separator provides one or more advantageous features, such as increasing the design surface loading rate into the treatment chamber; increasing the vortex strength above the inlet opening to the treatment chamber by using a conically shaped drop pipe, thereby improving capability to pull pollutants down into the treatment chamber and improve sediment, oil and floatables capture; reducing disruption to the vortex above the inlet opening to the treatment chamber by offsetting the inlet opening such that it is not in the direct path of influent flow from the inlet pipe; increasing sediment removal efficiency by diffusion of the influent stream in multiple directions into the treatment chamber through a perforated outlet section on the dispersion manifold at the bottom of the drop pipe; increasing sediment removal efficiency and reducing scour potential at high surface loading rates by eliminating the vortex in the cylindrical riser pipe by use of a vortex-disrupting vane within the riser pipe; providing capability for a single inlet pipe or multiple inlet pipes with a single insert design, and flow entry from the surface via an inlet grate at grade; providing a centrally located primary maintenance cleanout port of sufficient size for vactoring and rinsing of the treatment chamber; providing a primary maintenance cleanout port that does not require removal of a drop pipe to gain maintenance access; attenuating influent water velocity at larger inlet pipe slopes as flow exits the inlet pipe and enters the upper chamber by increasing ponding volume over the insert upstream of the weir, thereby enhancing sediment removal and reducing the potential for "hydraulic jump" over the insert weir; providing a partially-cylindrical and elevated curvature in the central portion of the weir that serves to reduce the potential for "hydraulic jump" over the weir; providing a sloping deck top surface upstream of the weir that minimizes accumulation of pollutants on the surface of the insert and allowing flushing of pollutants into the inlet to the treatment chamber as storms subside; and/or providing an optional removable flow deflector that attaches to the precast concrete top slab and beneath an inlet grate and frame, the removable flow deflector channeling inlet grate runoff onto the surface of the insert upstream of the weir, and allowing favorable positioning of the inlet grate and frame, and easy removal of flow deflector, to facilitate inspection and maintenance.

What is claimed is:

1. A separator unit, comprising:
    a tank defining an internal volume and having an inlet and an outlet;
    a deck within the tank and separating the tank into an upper chamber and a lower chamber, a weir at an upper side of the deck to define an inlet side atop the deck for receiving an influent liquid and an outlet side atop the deck, a first opening through the deck on the inlet side for delivering liquid down into the lower chamber, and a second opening through the deck on the outlet side for delivering liquid from the lower chamber back up into the upper chamber;
    wherein a drop pipe extends downward from the first opening to a dispersal manifold having a first primary lateral opening to direct water laterally into the lower chamber in one direction and a second primary lateral opening to direct water laterally into the lower chamber in another direction, wherein the dispersal manifold includes a central segment, a first side segment and a second side segment, wherein the central segment has a bottom wall that is non-perforated and a first sidewall facing a near wall of the tank and extending upward from the bottom wall and that is perforated.

2. The separator unit of claim 1, wherein each of the first side segment and the second side segment includes a convex surface side facing toward an inlet side of the tank.

3. The separator unit of claim 2, wherein a bottom wall of the first side segment is perforated and a bottom wall of the second side segment is perforated.

4. The separator unit of claim 3, wherein each side wall and a top wall of the first side segment is non-perforated, and each side wall and a top wall of the second side segment is non-perforated.

5. The separator unit of claim 2, wherein the drop pipe has a conical shape with flow area that reduces when moving downward.

6. The separator unit of claim 5, wherein a flow opening at the bottom of the drop pipe acts as a treatment flow control orifice for the separator unit.

7. The separator unit of claim 1, wherein the upper side of the deck includes a pair of angled step-downs from the inlet side to the outlet side, and the weir includes a pair of lateral wall segments each having a lower portion that is angled and mated to a respective one of the angled step-downs of the deck.

8. The separator unit of claim 1, wherein a riser pipe extends downwardly into the lower chamber from the second opening, wherein the riser pipe includes at least one vortex disrupting vane extending inwardly from an inner surface of the riser pipe.

9. The separator unit of claim 8, wherein the vortex disrupting vane comprises one of a flexible plate or a set of flexible filaments.

10. The separator unit of claim 1, wherein the deck includes a mount opening, a drop pipe assembly connected to the mount opening, the drop pipe assembly includes an upper support plate, the drop pipe and the dispersal manifold integrated as a unit, the upper support plate having a periphery that sits atop the mount opening, and the first opening is formed in the upper support plate.

11. The separator unit of claim 10, wherein the mount opening is bounded by a recess, the upper support plate has a peripheral shape that matches a peripheral shape of the recess so as to sit within the recess.

12. The separator unit of claim 11, wherein the peripheral shape of the recess and the peripheral shape of the upper support plate are non-symmetrical to assure desired positioning of the drop pipe assembly on the deck.

13. The separator unit of claim 11, wherein the mount opening is sized to permit the dispersal manifold and drop pipe to pass downward through the mount opening.

14. A separator unit, comprising:
a tank defining an internal volume and having an inlet and an outlet;
a deck within the tank and separating the tank into an upper chamber and a lower chamber, a weir at an upper side of the deck to define an inlet side atop the deck for receiving an influent liquid and an outlet side atop the deck, a first opening through the deck on the inlet side for delivering liquid down into the lower chamber, and a second opening through the deck on the outlet side for delivering liquid from the lower chamber back up into the upper chamber;
wherein a drop pipe extends downward from the first opening to a dispersal manifold having a first primary lateral opening to direct water laterally into the lower chamber in one direction and a second primary lateral opening to direct water laterally into the lower chamber in another direction, wherein the dispersal manifold includes a central segment aligned with the drop pipe, a first side segment forming the first primary lateral opening and a second side segment forming the second primary lateral opening, wherein the central segment has a bottom wall that is non-perforated, the first side segment includes a bottom wall that is perforated and the second side segment includes a bottom wall that is perforated.

15. The separator unit of claim 14 wherein the central segment includes a first sidewall facing a near wall of the tank, the first sidewall extending upward from the bottom wall, and the first sidewall is perforated.

* * * * *